(12) United States Patent
Gregg

(10) Patent No.: US 7,233,570 B2
(45) Date of Patent: Jun. 19, 2007

(54) LONG DISTANCE REPEATER FOR DIGITAL INFORMATION

(75) Inventor: Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 10/199,428

(22) Filed: Jul. 19, 2002

(65) Prior Publication Data

US 2004/0013088 A1    Jan. 22, 2004

(51) Int. Cl.
*H04L 12/26* (2006.01)
*H04L 12/28* (2006.01)
*H04J 3/16* (2006.01)

(52) U.S. Cl. .................. 370/235; 370/404; 370/468
(58) Field of Classification Search ............... 370/235, 370/236, 404, 468
See application file for complete search history.

(56) References Cited

U.S. PATENT DOCUMENTS

| 6,839,794 | B1 * | 1/2005 | Schober | 710/316 |
| 6,920,106 | B1 * | 7/2005 | Chou et al. | 370/229 |
| 6,950,394 | B1 * | 9/2005 | Chou et al. | 370/229 |
| 6,973,085 | B1 * | 12/2005 | Acharya | 370/392 |
| 6,999,462 | B1 * | 2/2006 | Acharya | 370/401 |
| 2001/0043564 | A1 * | 11/2001 | Bloch et al. | 370/230 |
| 2002/0159385 | A1 * | 10/2002 | Susnow et al. | 370/229 |
| 2003/0016683 | A1 * | 1/2003 | George et al. | 370/404 |

* cited by examiner

*Primary Examiner*—Hassan Kizou
*Assistant Examiner*—Hong Sol Cho
(74) *Attorney, Agent, or Firm*—Lynn L. Augspurger

(57) ABSTRACT

An apparatus and method for extending digital data transmission link distances provide a mechanism in which data is transmitted over relatively long distances using a repeater to provide data buffering and handle the flow control. The repeater function incorporates large virtual lane receiver buffers in its long distance ports. Enough virtual lanes are implemented so that service level to virtual lane mapping is not required, allowing the repeaters to be made invisible to Subnet Management.

13 Claims, 14 Drawing Sheets

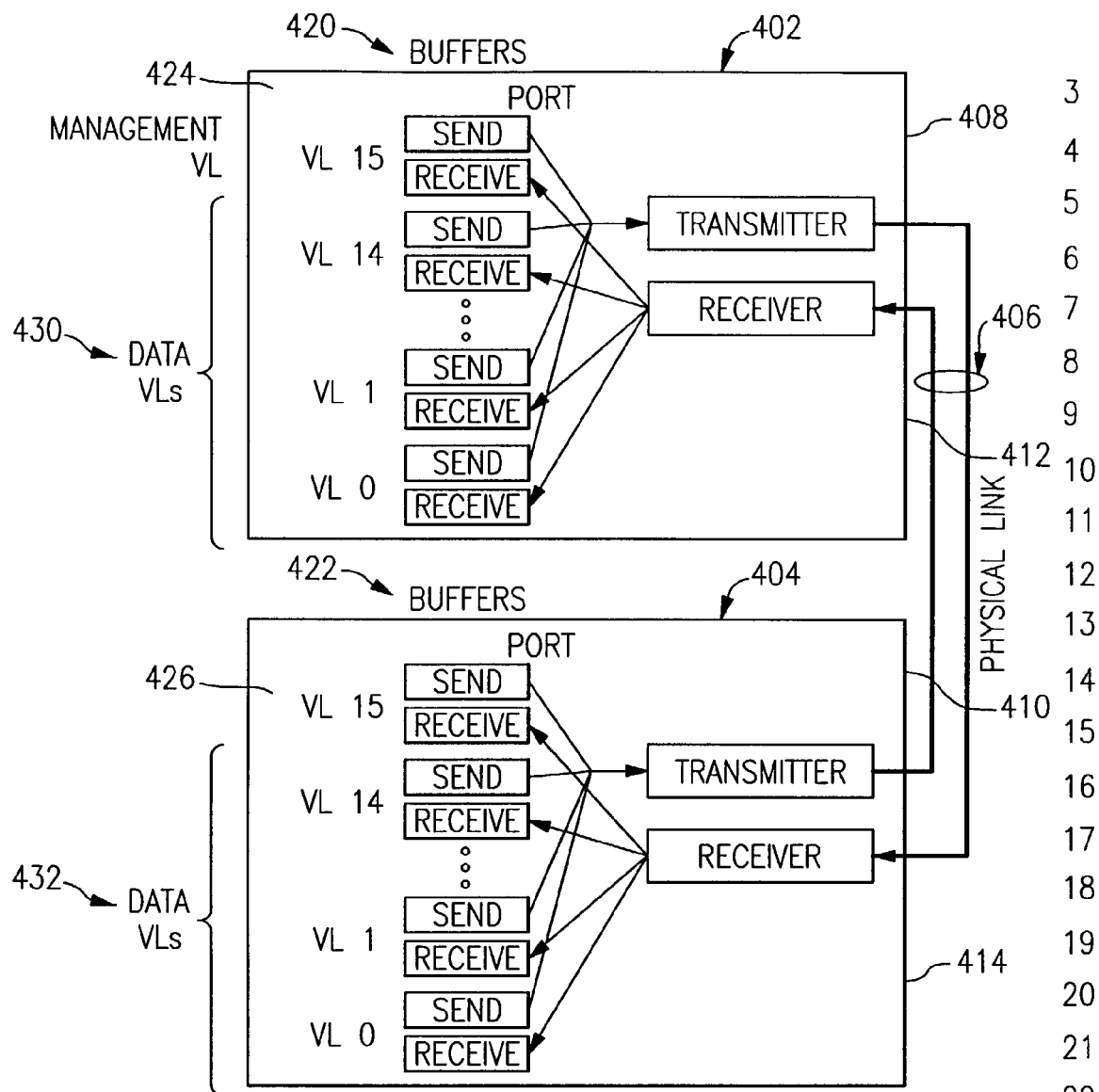
FIG.4
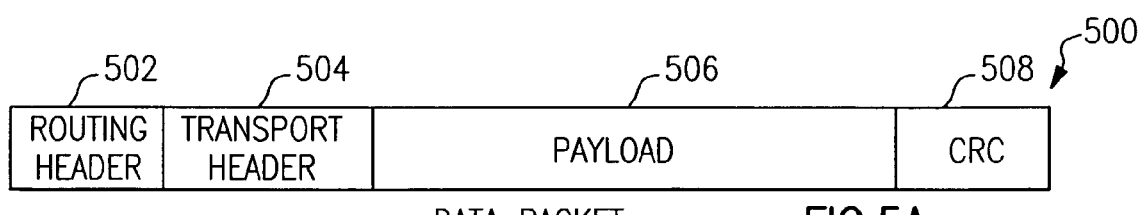
DATA PACKET  FIG.5A
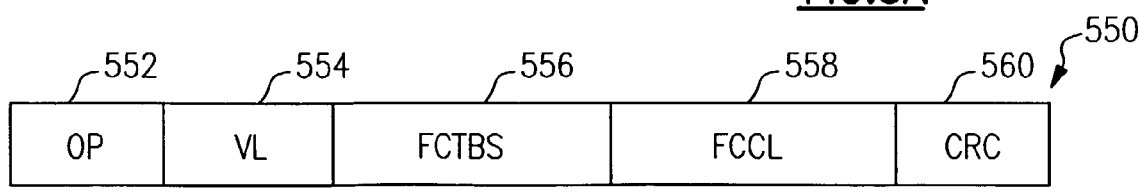
FLOW CONTROL PACKET  FIG.5B

| DATA RATE  LINK LENGTH | 250 MB PER SEC. (x1) | 1 GB PER SEC. (x4) | 3 GB PER SEC. (x12) |
|---|---|---|---|
| 10 METERS | 25 | 100 | 300 |
| 30 METERS | 75 | 300 | 900 |
| 100 METERS | 250 | 1 K | 3 K |
| 300 METERS | 750 | 3 K | 12 K |
| 1 KM | 2.5 K | 10 K | 30 K |
| 4.4 KM | 10.9 K | 43.7 K | 131 K |
| 10 KM | 25 K | 100 K | 300 K |
| 13.1 KM | 32.8 K | 131 K | 393 K |
| 30 KM | 70 K | 300 K | 900 K |
| 52.4 KM | 131 K | 524 K | 1.57 M |
| 100 KM | 250 K | 1 M | 3 M |

VL RECEIVE BUFFER SIZES
(IN BYTES)
FOR OPTICAL LINKS

FIG.12

LONG DISTANCE REPEATER FOR DIGITAL INFORMATION

FIELD OF THE INVENTION

The present invention is directed to an improved data processing system. More specifically, the present invention provides an apparatus and method for transmitting data over relatively long distances using a repeater to provide data buffering and handle the flow control.

Trademarks: IBM is a registered trademarks of International Business Machines Corporation, Armonk, N.Y., U.S.A.. Other names may be registered trademarks or product names of International Business Machines Corporation or other companies. As used herein InfiniBand means 'infinite bandwidth' and refers to the bus technology planned to replace the PCI bus standard, providing a greater shared bandwidth in accordance with the standards developed by the Infini-Band Trade Association members including Intel, Dell, Hewlett-Packard, IBM, Microsoft and Sun Microsystems.

BACKGROUND OF THE INVENTION

In a System Area Network (SAN), such as an InfiniBand (IB) network, the hardware provides a message passing mechanism that can be used for Input/Output devices (I/O) and interprocess communications (IPC) between general computing nodes. Processes executing on devices access SAN message passing hardware by posting send/receive messages to send/receive work queues on a SAN channel adapter (CA). These processes also are referred to as 'consumers.'

The send/receive work queues (WQ) are assigned to a consumer as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

Channel adapters may be either directly connected together or can be connected through the SAN fabric. The SAN fabric comprises one or more switches and/or one or more routers. In any case, the links between the channel adapter ports, switch ports, and router ports are point to point and have separate conductors in each direction. Each of the two ports connected by a link has multiple virtual lanes (VL). Virtual lanes provide a mechanism for creating multiple virtual links on a single physical link. Associated with each virtual lane is a virtual lane buffer which is used to control the flow of packets. The flow control is credit based which means that the transmitter sends packets only if there is sufficient empty space in the receiving virtual lane buffer.

Some of the virtual lane buffer space at the receiver accommodates the round trip delay on the link. As links get longer, the round trip delay increases and larger virtual lane buffers are required to keep the link going at full speed. With a given size of virtual lane receiver buffers, at some distance the round trip link delay is enough that the cerdits do not arrive at the transmitter quickly enough to keep the link going at full speed.

Implementations of channel adapters, switches, and routers limit the virtual lane buffering to the amount anticipated by the configuration, and most configurations limit the links to less than 300 meters. What is needed is a way to extend links to many kilometers while maintaining the full link speed without adding large virtual lane buffers to every channel adapter, switch, and router port. By introducing a repeater that has large virtual link buffers, very long distances can be achieved. At some point, the format of the flow control packets must be expanded to accommodate the larger buffers. The repeater may or may not be visible to the various layers of link management software and firmware, and making the repeater invisible requires further changes to the flow control process.

The repeater function could either be incorporated into switch or router ports or it could be a stand alone device in which case it looks like a two port switch. Additionally, the repeater function could be constructed to be transparent to management software and firmware.

SUMMARY OF THE INVENTION

The present invention provides an apparatus and method for greatly extending the operational distance of InfiniBand links. Rather than requiring very large virtual lane receiver buffers in all of the channel adapter, switch, and router ports to handle the long distance flow control, a pair of repeaters is inserted into a link. The link between the extenders is the long distance link, and the ports used by this long distance link provide the large virtual lane buffers to handle the long distance flow control at full link speed.

In one embodiment, the repeaters are invisible to the InfiniBand management software. Each repeater has a short distance port and a long distance port. The short distance port can be either electrical or optical and can operate at any valid InfiniBand speed or link width. The virtual lane buffering for this short distance port supports links up to about 300 meters at the full ×12 speed (3 gigabytes per second in each direction). The long distance port is usually optical and it operates at the narrowest width (×1) to avoid the skew problems of multiple conductors. The long distance port can operate at either the InfiniBand speed or it can operate at a faster speed (10 gigabits per second) to emulate the ×4 InfiniBand link width. The virtual lane buffers for the long distance ports supports distances of up to about 100 kilometers at speeds of 10 gigabits per second in each direction (1 gigabyte per second); however, extensions are required to the flow control packets of the long distance link used between the two repeaters. By assigning a dedicated virtual lane for each of the 16 service levels and an additional virtual lane for the subnet management virtual lane (VL15) and changing the flow control process to handle 16 virtual lanes instead of only 15 virtual lanes, the repeaters can be made invisible to the InfiniBand management software.

In another embodiment, the repeater function is buried into switches. Some number of switch ports are then configured with large enough virtual lane buffers to handle the long distance flow control. Of course, long distance ports are required at both ends of the long distance link for the full data rate to be realized in both directions.

In either embodiment, the virtual lanes for the repeater function may be made visible to the InfiniBand management software, but no special consideration needs to be taken into account. But having many virtual lanes with full long distance buffering reduces the head of line blocking and dead lock situations. Once again, the very long distances still need extensions to the flow control packets, but these extensions are invisible to the other InfiniBand layers.

These and other improvements are set forth in the following detailed description. For a better understanding of the invention with advantages and features, refer to the description and to the drawings.

BRIEF DESCRIPTION OF THE DRAWINGS

FIG. 4 is a diagram illustrating virtual lanes in accordance with a preferred embodiment of the present invention;

FIG. 5A is an illustration of a data packet in accordance with a preferred embodiment of the present invention;

FIG. 5B is an illustration of a flow control packet in accordance with a preferred embodiment of the present invention;

FIG. 12 is a table depicting the virtual lane receiver buffer sizes as a function of the link data rate and the link length in accordance with the present invention;

The detailed description explains the preferred embodiments of the invention, together with advantages and features, by way of example with reference to the drawings.

DETAILED DESCRIPTION OF THE PREFERRED EMBODIMENT

The present invention provides an apparatus and method for transmitting data over relatively long distances using a repeater to provide data buffering and handle the flow control. InfiniBand suggests using a pair of routers interconnected by an appropriate link (more than likely not InfiniBand) to achieve long distance solutions. Unfortunately, this solution requires all of the non trivial complexities of the router including dividing the fabric into at least two separate subnets. With the present invention, the single subnet is preserved along with its simplicity of management by providing a repeater that can be largely transparent to the InfiniBand management software.

Figure 1:
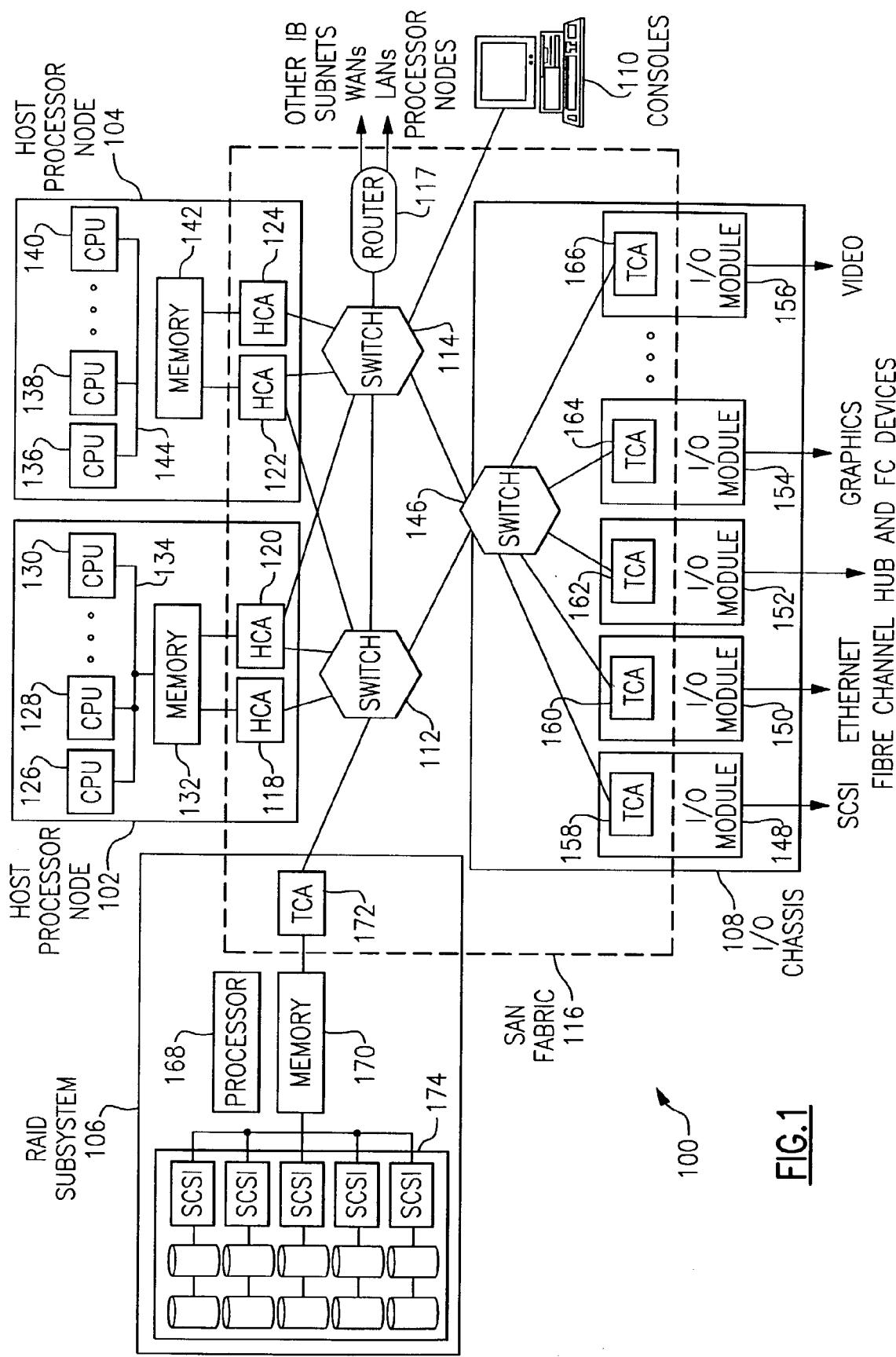
FIG. 1 is a diagram of a distributed computer system.

With reference now to the figures and in particular with reference to FIG. 1, a diagram of a distributed computer system is illustrated in accordance with the prior art. The distributed computer system represented in FIG. 1 takes the form of a system area network (SAN) 100 and is provided merely for illustrative purposes, and the embodiments of the prior art described below can be implemented on computer systems of numerous other types and configurations. For example, computer systems implementing the prior art can range from a small server with one processor and a few input/output (I/O) adapters to massively parallel supercomputer systems with hundreds or thousands of processors and thousands of I/O adapters. Furthermore, the prior art can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the prior art, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols.

In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications. As indicated in FIG. 1, router 116 is coupled to wide area network (WAN) and/or local area network (LAN) connections to other hosts or other routers. In the prior art, the suggested implementation for long distance connections is through routers.

The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment of the prior art, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment or the prior art, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
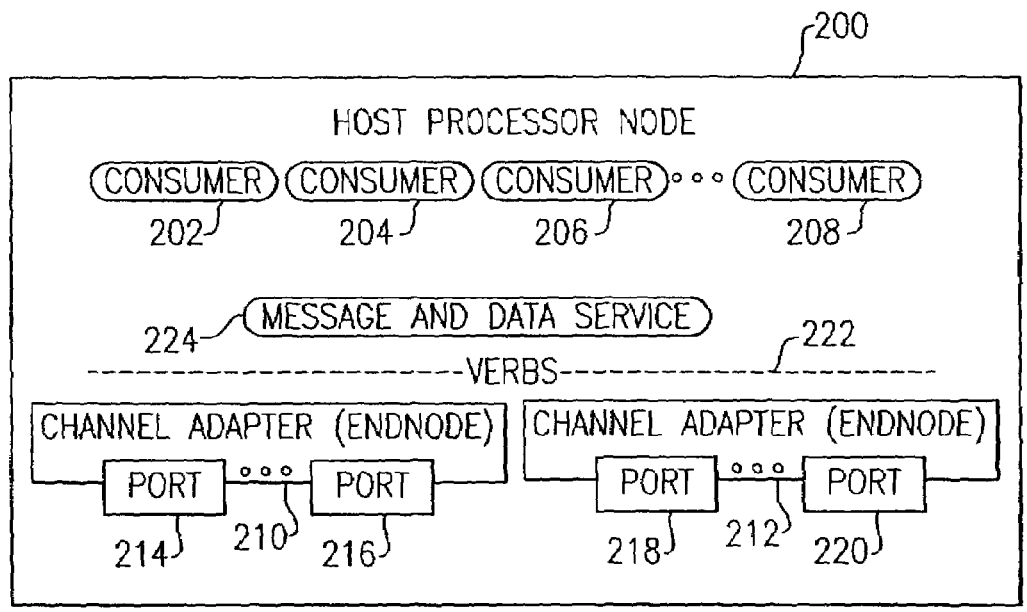
FIG. 2 is a functional block diagram of a host processor node.

Turning next to FIG. 2, a functional block diagram of a host processor node is depicted in accordance with the prior art. Host processor node 200 is an example of a host processor node, such as host processor node 102 in FIG. 1.

In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

Figure 3A:
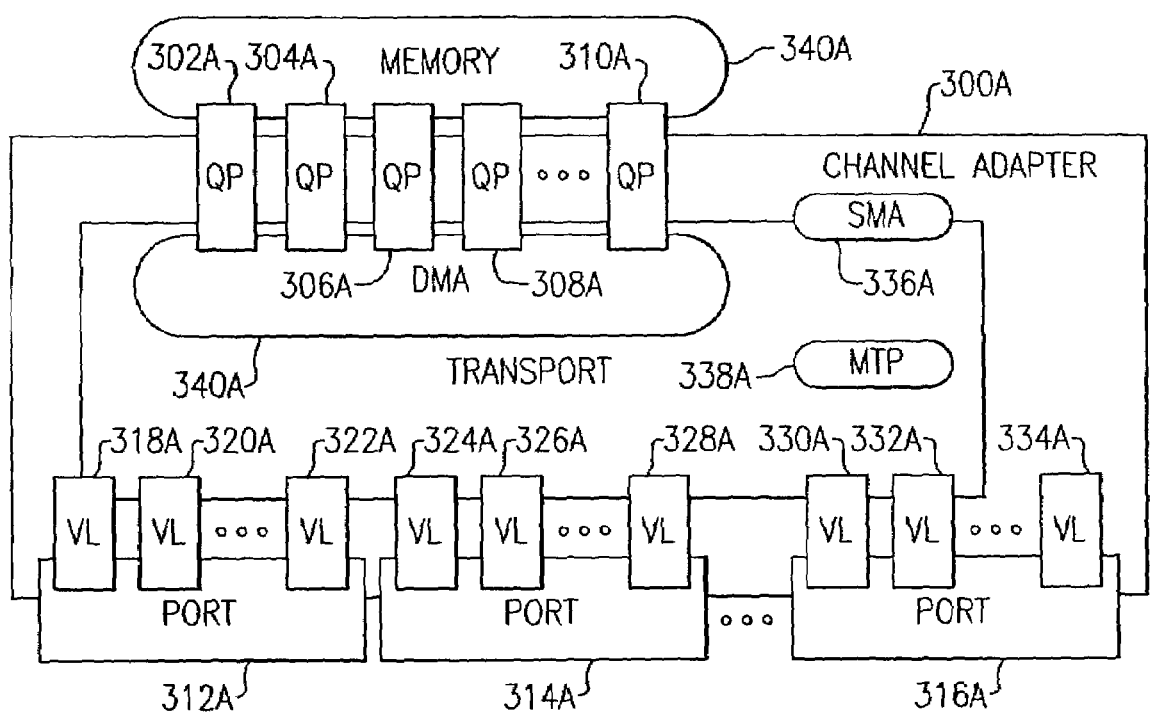
FIG. 3A is a diagram of a host channel adapter.

With reference now to FIG. 3A, a diagram of a host channel adapter is depicted in accordance with the prior art. Host channel adapter 300A shown in FIG. 3A includes a set of queue pairs (QPs) 302A–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID.

Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A–310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
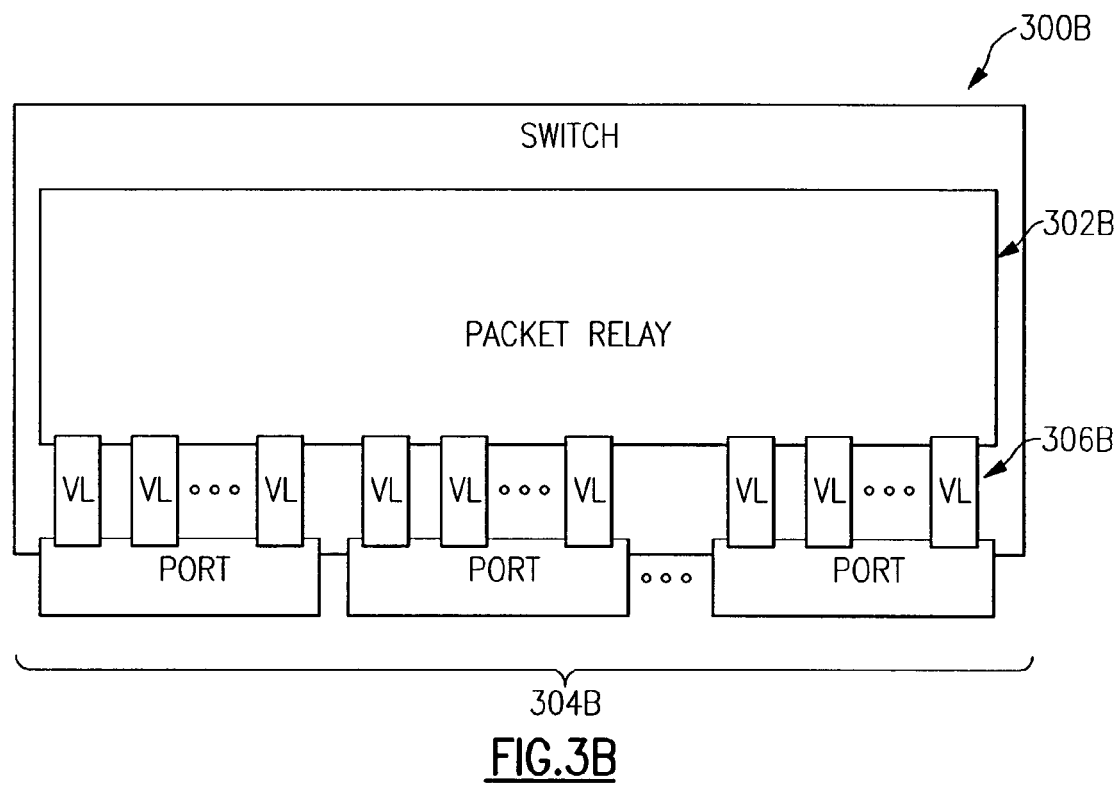
FIG. 3B is a diagram of a switch.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
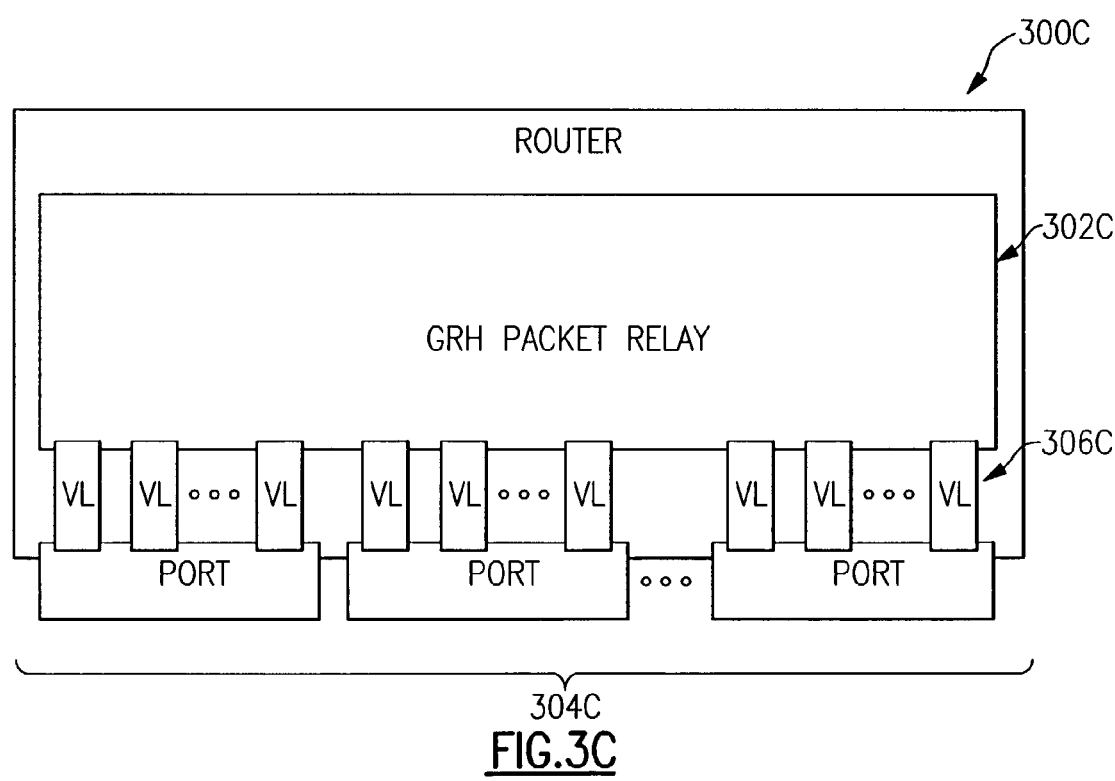
FIG. 3C is a diagram of a router.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into thy SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes, and are described in more detail later. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

With reference now to FIG. 4, each pair of ports 402, 404 is interconnected by a physical link 406. Each port has a transmitter 408, 410 and a receiver 412, 414. Multiple virtual lanes are provided in each port, and each virtual lane has its own data buffering and flow control. Additionally, for each virtual lane the flow control for transmitting packets is independent from the flow control for receiving packets. Each port is required to have a virtual lane 15 (VL15) 424, 426 used for subnet management packets, and each port is required to have at least one data VL 430, 432 for normal data packets. Each port may have 1, 2, 4, 8, or 15 data VLs, and they are always numbered starting with VL0 and incrementing to VL14. If one port of a physical link supports fewer data VLs than the other port, then both ports are configured to use the small number of data VLs.

Each VL has independent buffers 420, 422, one for sending packets and another for receiving packets. The data VLs use an 'absolute' credit based flow control where a credit limit is sent from the receiver to the transmitter instructing how much empty buffer space is available at the receiver for the reception of packets. VL15 only requires a receiver buffer large enough for a single subnet management packet (on the order of 256 bytes plus headers and trailers) and VL15 does not use any flow control.

There are two kind of packets, and they are illustrated in FIGS. 5A and 5B. The data packet is shown in FIG. 5A. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

The data packets 500 comprise a routing header field 502, transport header field 504, payload field 506, and CRC checking field 508. Data packets 500 transport the consumer data in the payload fields and payloads may be as long as 4096 bytes. The transport header field 504 in this example specifies the destination queue pair for payload 506. Additionally, transport header 504 also provides information such as the operation code, packet sequence number, and partition for the payload 506.

FIG. 5B illustrates a flow control packet. Flow control packets are generated and consumed by the two ends of a physical link, and they are not forwarded through either switches or routers. The flow control packets 550 comprise an OP (op code) field 552, a VL field (virtual lane number) 554, an FCTBS field (flow control total blocks sent) 556, an FCCL field (flow control credit limit) 558, and a CRC checking field 560. There are two OP field 552 values; one indicates a normal flow control packet and the other indicates an initialization flow control packet. The VL field 554 indicates the virtual lane that the flow control packet is for. The FCTBS field 556 is generated by the transmitter portion of the virtual lane, and the FCCL field 558 is generated by the receiver portion of the virtual lane.

The unit of flow is a 64 byte block, and flow control is applied to data packets only; flow control packets are processed 'on the fly' and are not counted as part of the number of blocks either transmitted or received. The number of blocks comprising a data packet includes the headers 552, 554, the payload 556, and the CRC 558. The number of blocks is rounded up to the next whole number of blocks. The FCTBS 556 and FCCL 558 fields both have 12 bits, and they represent numbers of blocks modulo 4096. Of course, other block sizes and block count sizes could be used.

When a flow control packet is transmitted, the transmitter portion of the virtual lane sets the FBTBS field 556 to the total number of blocks transmitted in all of the data packets since the link was initialized, and the receiver portion of the virtual lane sets the FCCL field 558 to the maximum number of blocks that the receiver has empty space for in its buffer.

Figure 6:
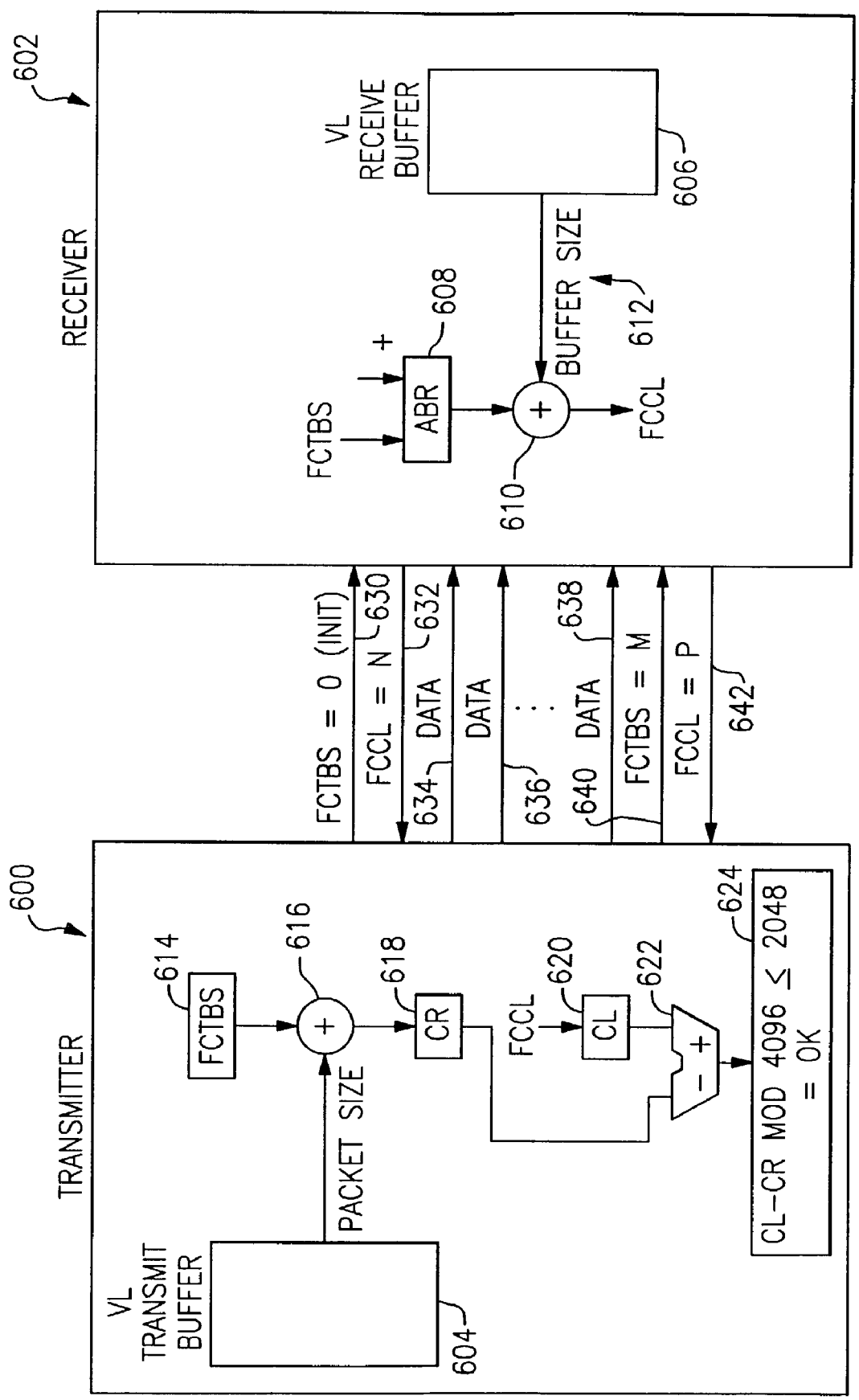
FIG. 6 is a diagram illustrating the flow control process in one direction for a single virtual lane in accordance with a preferred embodiment of the present invention.

FIG. 6 illustrates the flow control process in more detail by showing the control registers and sequence used by a single VL in one direction. For each VL there are two independent flow control processes, one in each direction. Note that a single flow control packet transmits information for both directions of the virtual lane. The transmitter 600 includes an FCTBS register 614 that is 12 bits wide and counts blocks as data packets 634, 636, 638 are transmitted. The contents of the FCTBS register 614 are placed into the FCTBS field 556 of flow control packets 630, 640 as they are transmitted. After link initialization, the FCTBS register 614 is set to zero and the first flow control packet 630 is transmitted. The CR register 618 is the sum of the FCTBS register and the number of blocks to be transmitted in the next packet in the VL transmit buffer 604. The CL register 620 receives the credit limit from the FCCL field 558 of flow control packets 632, 642 from the receiver.

The receiver 602 includes an ABR (adjusted blocks received) register 608 that is loaded from the FCTBS field 556 in flow control packets received from the transmitter 600 and is incremented as data packets are received from the transmitter 600. The ABR register 608 in effect follows the FCTBS register 614 in the transmitter 600. If the number of empty blocks in the VL receive buffer 606 would permit reception of 2048 or more blocks from all combinations a valid data packets, the FCCL field 558 in flow control packets sent by the receiver 602 is set to the sum of the ABR register 608 and 2048 modulo 4096. If the VL receiver buffer 606 has less empty space than 2048 blocks, the FCCL field 558 is set to the sum of the ABR register and the number of empty blocks in the VL receive buffer 606. Meanwhile back at the transmitter 600, a data packet is sent only if the value in the CR register 618 subtracted from the CL register 620 module 4096 is less than or equal to 2048.

The flow control is tolerant of lost data and flow control packets because both the transmitter 600 and receiver 602 are continually keeping each other in synchronism. Also note that flow control packets must be transmitted by the receiver 602 often enough to ensure that the transmitter 600 does not run out of credits.

Figure 7:
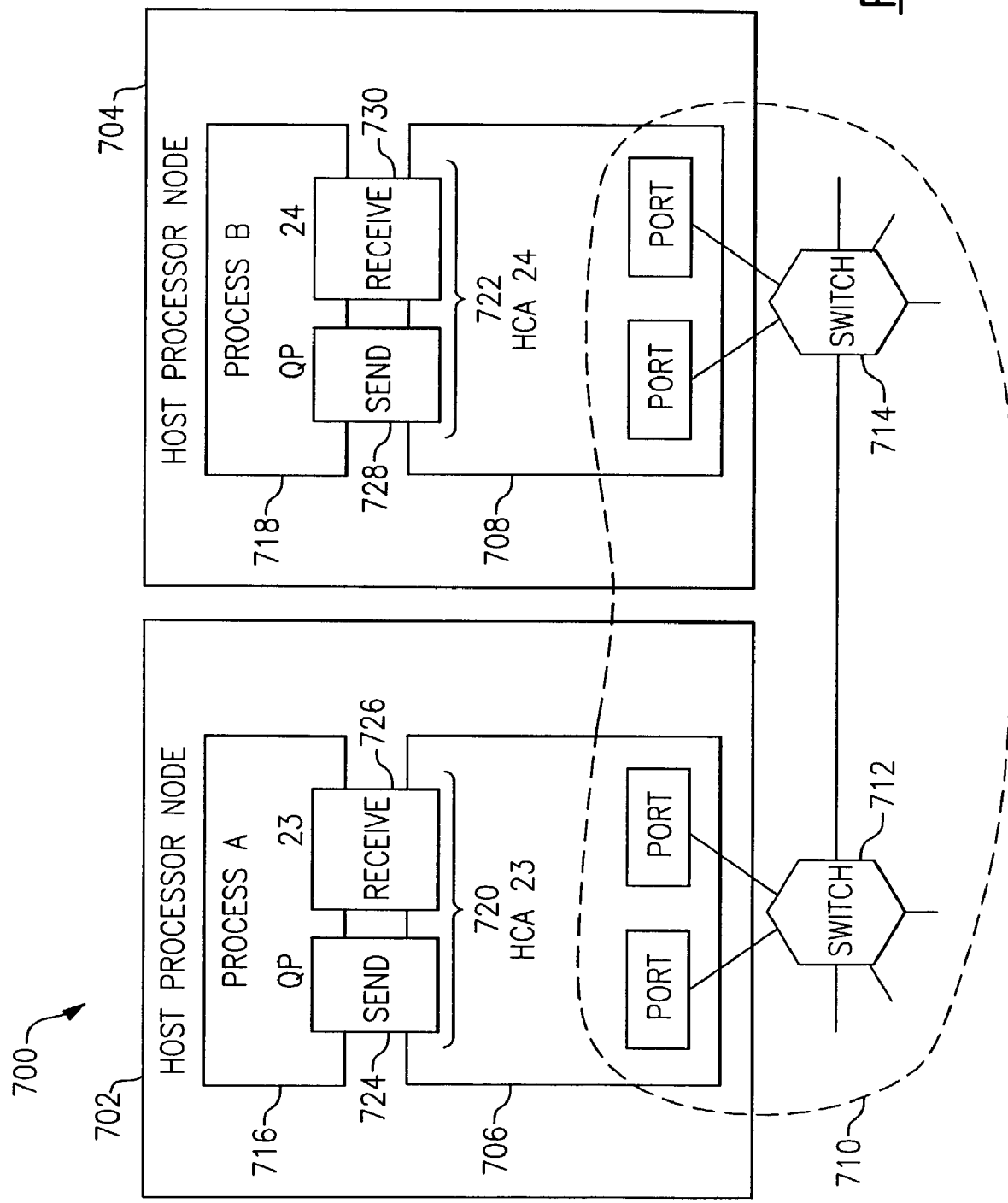
FIG. 7 is a diagram illustrating a portion of a distributed computer system in accordance with a preferred embodiment of the present invention.

In FIG. 7, a portion of a distributed computer system is depicted to illustrate a flow of data packets. The distributed computer system in FIG. 7 includes a host processor node 702 and a host processor node 704. Host processor node 702 includes a host channel adapter 706. Host processor node 704 includes a host channel adapter 708. The distributed computer system in FIG. 7 includes a SAN fabric 710, which includes a switch 712 and a switch 714. The SAN fabric includes a link coupling host channel adapter 706 to switch 712; a link coupling switch 712 to switch 714; and a link coupling host channel adapter 708 to switch 714.

In the example transactions, host processor node 702 includes a client process A. Host processor node 704 includes a client process B. Client process A interacts with host channel adapter hardware 706 through queue pair 724. Client process B interacts with hardware channel adapter hardware 708 through queue pair 728. Queue pairs 724 and 728 are data structures that include a send work queue and a receive work queue.

Figure 8:
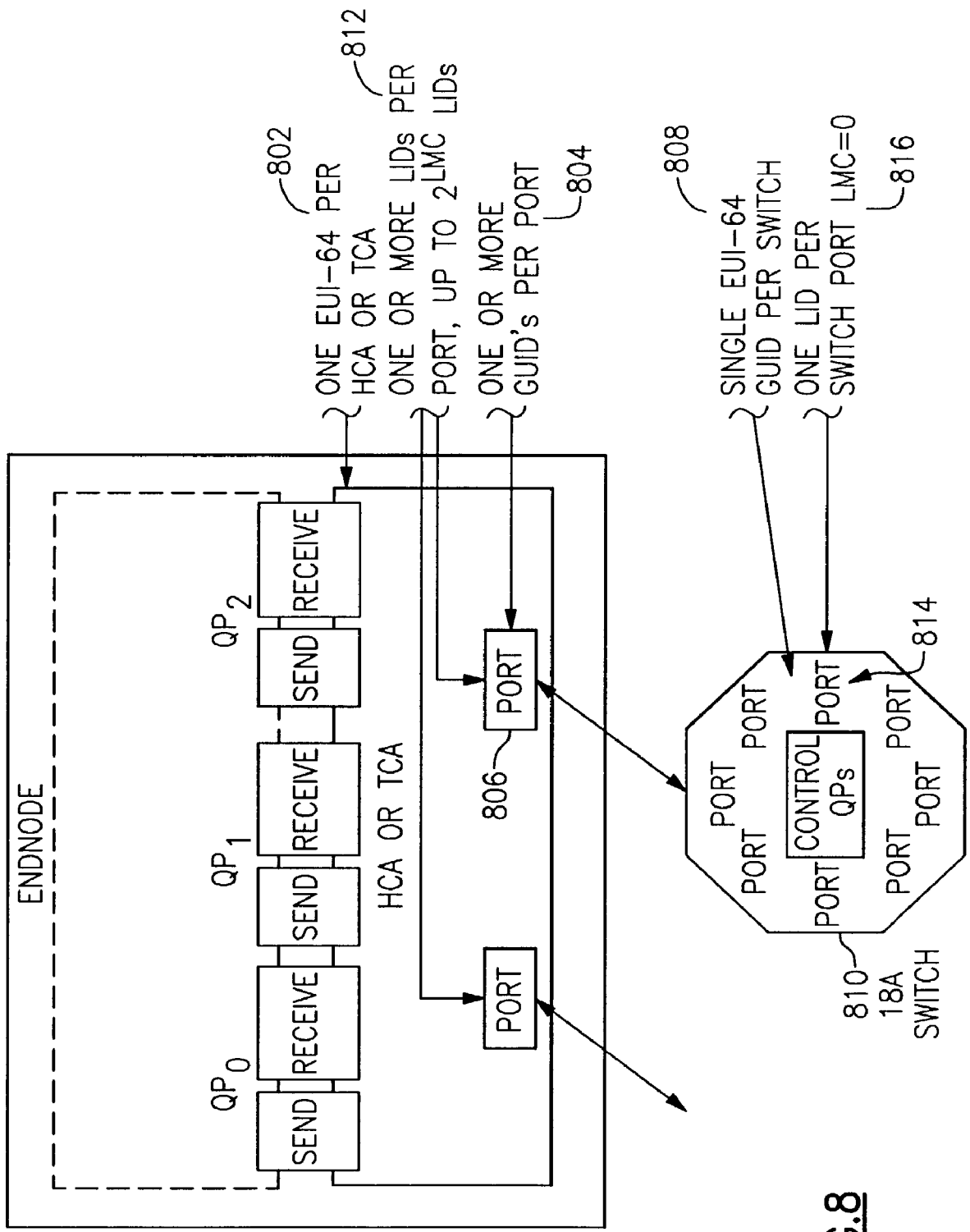
FIG. 8 is a diagram illustrating the network addressing used in a distributed networking system in accordance with the present invention.

In reference to FIG. 8, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs.

A single IEEE assigned 64-bit identifier (EUI-64) 802 is assigned to each component. A component can be a switch, router, or CA.

One or more globally unique ID (GUID) identifies 804 are assigned per CA port 806. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes. One GUID 808 is assigned to a switch 810.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 806 has up to $2^{LMC}$ LIDs 812 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. A single switch port 814 has one LID 816 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 9:
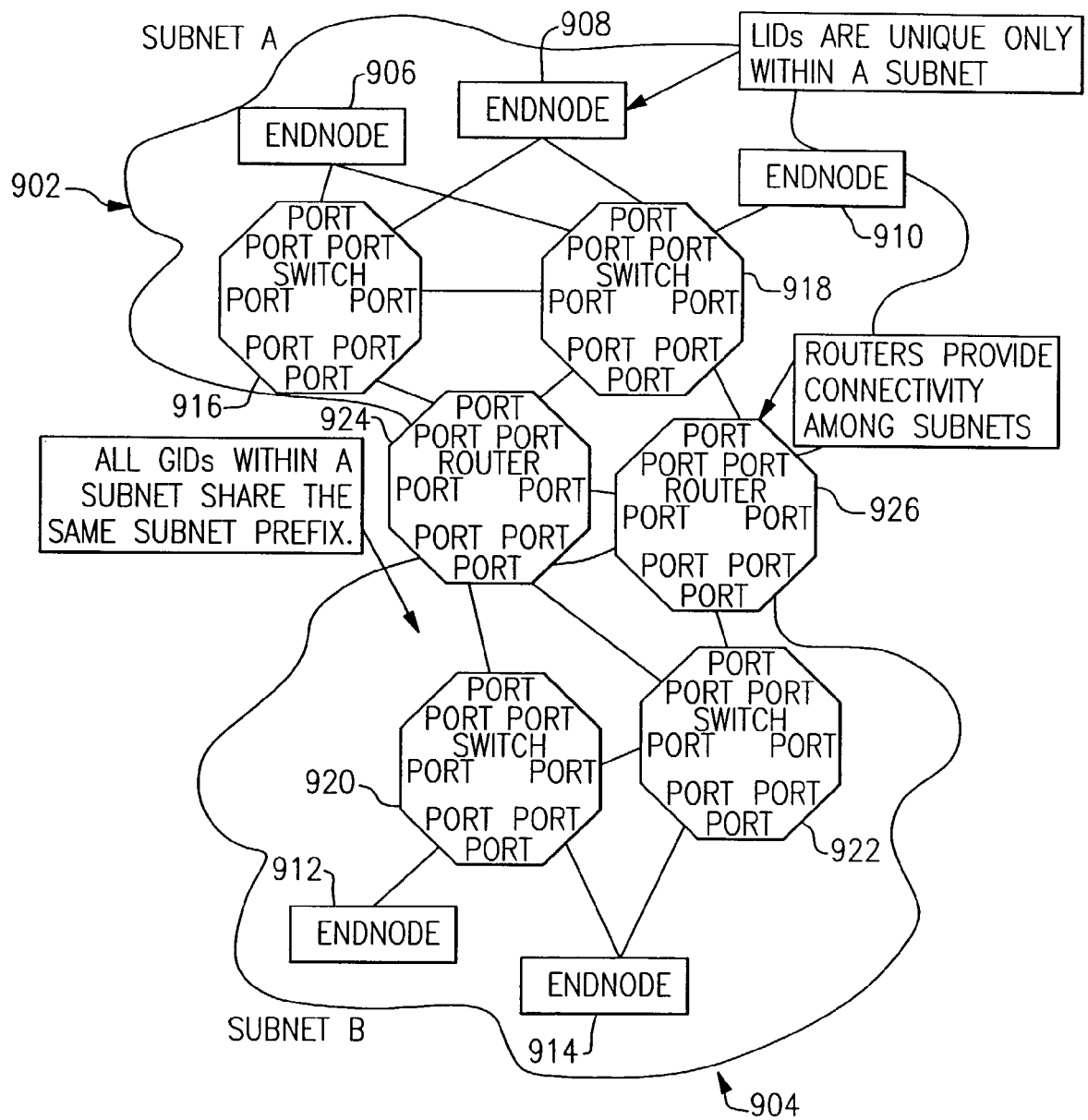
FIG. 9 is a diagram illustrating a portion of a distributed computing system in accordance with a preferred embodiment of the present invention in which the structure of SAN fabric subnets is illustrated.

A portion of a distributed computer system in accordance with a preferred embodiment of the present invention is illustrated in FIG. 9. Distributed computer system 900 includes a subnet 902 and a subnet 904. Subnet 902 includes host processor nodes 906, 908, and 910. Subnet 904 includes host processor nodes 912 and 914. Subnet 902 includes switches 916 and 918. Subnet 904 includes switches 920 and 922.

Routers connect subnets. For example, subnet 902 is connected to subnet 904 with routers 924 and 926. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of endnodes formed by cascaded switches.

As illustrated in FIG. 9, for expansion to much larger systems, subnets are connected with routers, such as routers 924 and 926. The router interprets the IP destination ID (e.g., IPv6 destination ID) and routes the IP-like packet.

An example embodiment of a switch is illustrated generally in FIG. 3B. Each I/O path on a switch or router has a port. Generally, a switch can route packets from one port to any other port on the same switch.

Within a subnet, such as subnet 902 or subnet 904, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing oblivious routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIG. 3A. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment. In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgment data packets acknowledge one or more valid and accepted request data packets. The requestor can have multiple outstanding request data packets before it receives any acknowledgments. In one embodiment, the number of multiple outstanding messages, i.e. Request data packets, is determined when a queue pair is created.

Figure 10:
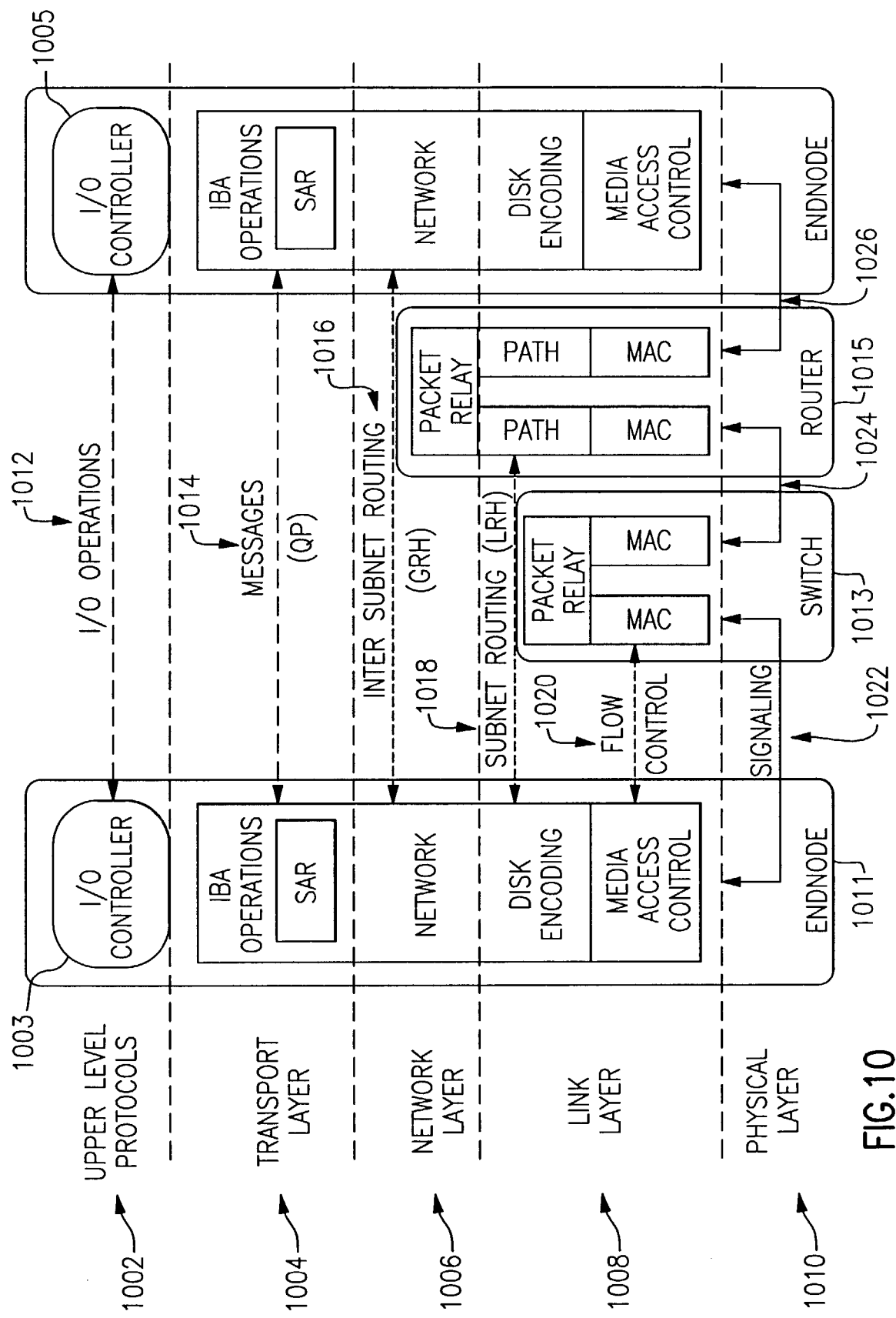
FIG. 10 is a diagram of a layered communication architecture used in a preferred embodiment of the present invention.

One embodiment of a layered architecture for implementing the present invention is generally illustrated in diagram form in FIG. 10. The layered architecture diagram of FIG. 10 shows the various layers of data communication paths, and organization of data and control information passed between layers.

Host channel adaptor endnode protocol layers (employed by endnode 1011, for instance) include an upper level protocol 1002 defined by consumer 1003, a transport layer 1004; a network layer 1006, a link layer 1008, and a physical layer 1010. Switch layers (employed by switch 1013, for instance) include link layer 1008 and physical layer 1010. Router layers (employed by router 1015, for instance) include network layer 1006, link layer 1008, and physical layer 1010.

The layered architecture generally follows an outline of a classical communication stack. With respect to the protocol layers of end node 1011, for example, upper layer protocol 1002 employs verbs (1012) to create messages at transport layer 1004. Transport layer 1004 passes messages (1014) to network layer 1006. Network layer 1006 routes packets between network subnets (1016). Link layer 1008 routes packets within a network subnet (1018). Physical layer 1010 sends bits or groups of bits to the physical layers of other devices. Each of the layers is unaware of how the upper or lower layers perform their functionality.

Consumers 1003 and 1005 represent applications or processes that employ the other layers for communicating between endnodes. Transport layer 1004 provides end-to-end message movement. In one embodiment, the transport layer provides four types of transport services as described above which are reliable connection service; reliable datagram service; unreliable datagram service; and raw datagram service. Network layer 1006 performs packet routing through a subnet or multiple subnets to destination endnodes. Link layer 1008 performs flow-controlled, error checked, and prioritized packet delivery across links.

Physical layer 1010 performs technology-dependent bit transmission. Bits or groups of bits are passed between physical layers via links 1022, 1024, and 1026. Links can be implemented with printed circuit copper traces, copper cable, optical cable, or with other suitable links.

Figure 11:
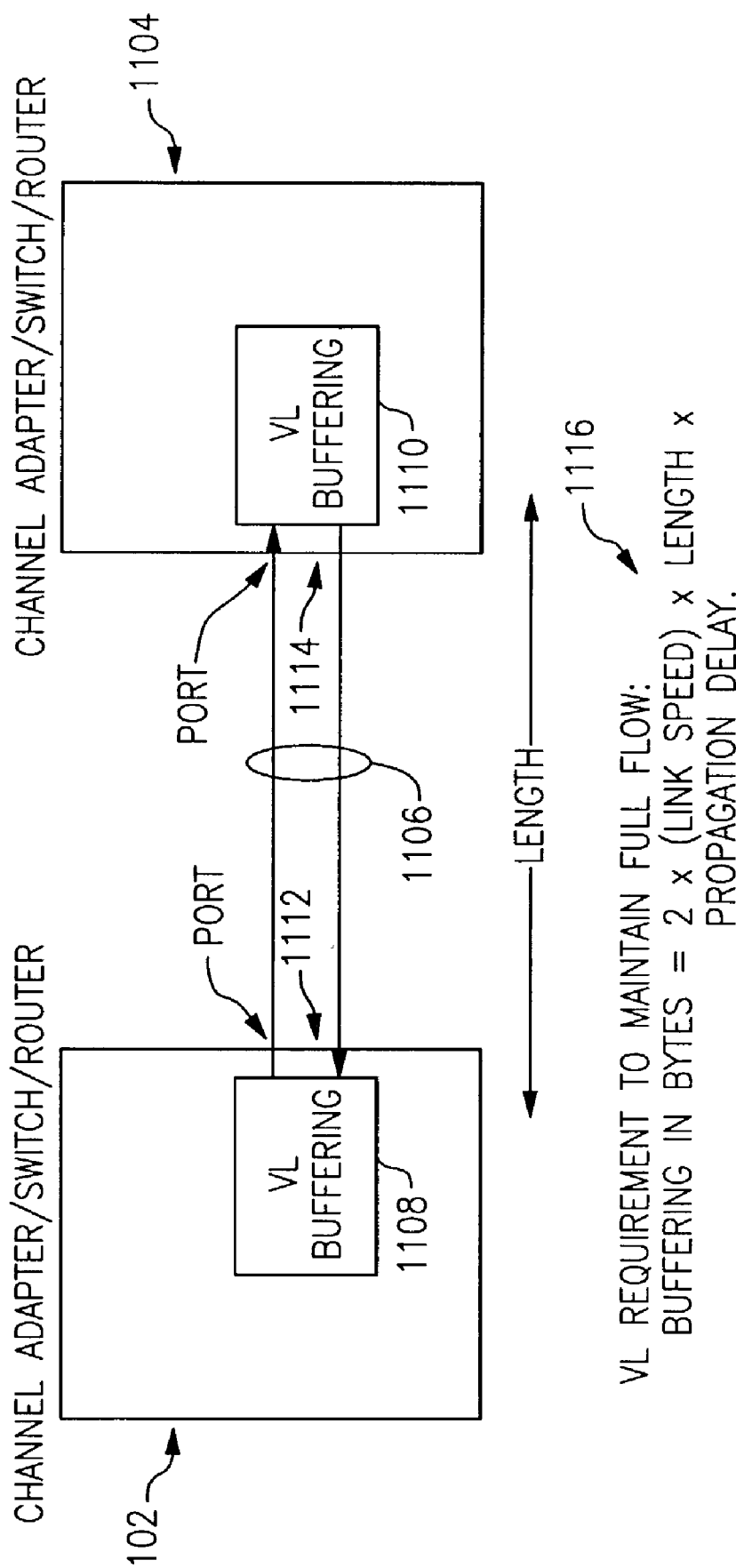
FIG. 11 is a diagram illustrating the relationship between virtual lane receiver buffer sizes and the length of the link accordance with the present invention.

FIG. 11 shows the relationship between the size of the VL receiver buffers and the length of the links connecting the two ports. CA/Switch/Router 1102, 1104 each have a port 1112, 1114 interconnected by link 1106. Port 1112 has VL buffers 1108 and port 1114 has VL buffers 1110. For the flow control to allow the full link speed to be realized, each VL receiver buffer must be large enough to hold all the data that can be transmitted in the time it takes to make an entire round trip between the two ports 1112, 1114. Equation 1116 shows how the VL receiver buffer size is calculated as a function of the link data rate, length, and propagation speed. The calculation does not include the additional VL receiver buffer space for packet processing time. This processing time, and therefore the additional VL receiver buffer space required, does not depend on the length of the link.

FIG. 12 is a table showing VL receiver buffer sizes for several combinations of link data rates and link lengths assuming only propagation time and zero packet processing time. The table 1202 assumes an optical link with a propagation speed of 5 nanoseconds per meter. The three data rates are the standard InfiniBand rates of 250 megabytes per second 1204 with a single conductor operating at 2.5 gigabits per second, 1 gigabyte per second 1206 with four conductors, and 3 gigabytes per second 1208 with 12 conductors. Eleven link lengths are shown 1210. For each length, the VL receiver buffer size is shown for each of the three data rates. For example, a 3 gigabyte per second link at 300 meters requires 12 kilobytes 1212 of receiver buffer space for each VL.

Since InfiniBand limits the size of the FCTBS 556 and FCCL 558 fields in the flow control packets to 12 bits and allows an advertisement of up to 2048 blocks with a block size of 64 bytes, the flow control supports VL receiver buffers up to 131 kilobytes. Therefore, the maximum link length at 250 megabytes per second is 52.4 kilometers 1216, at 1 gigabyte per second is 13.1 kilometers 1220, and at 3 gigabytes per second is 4.4 kilometers 1218. To achieve longer link lengths, the flow control must be modified by expanding the FCTBS 556 and FCCL 558 fields in the flow control packets.

Figure 13:
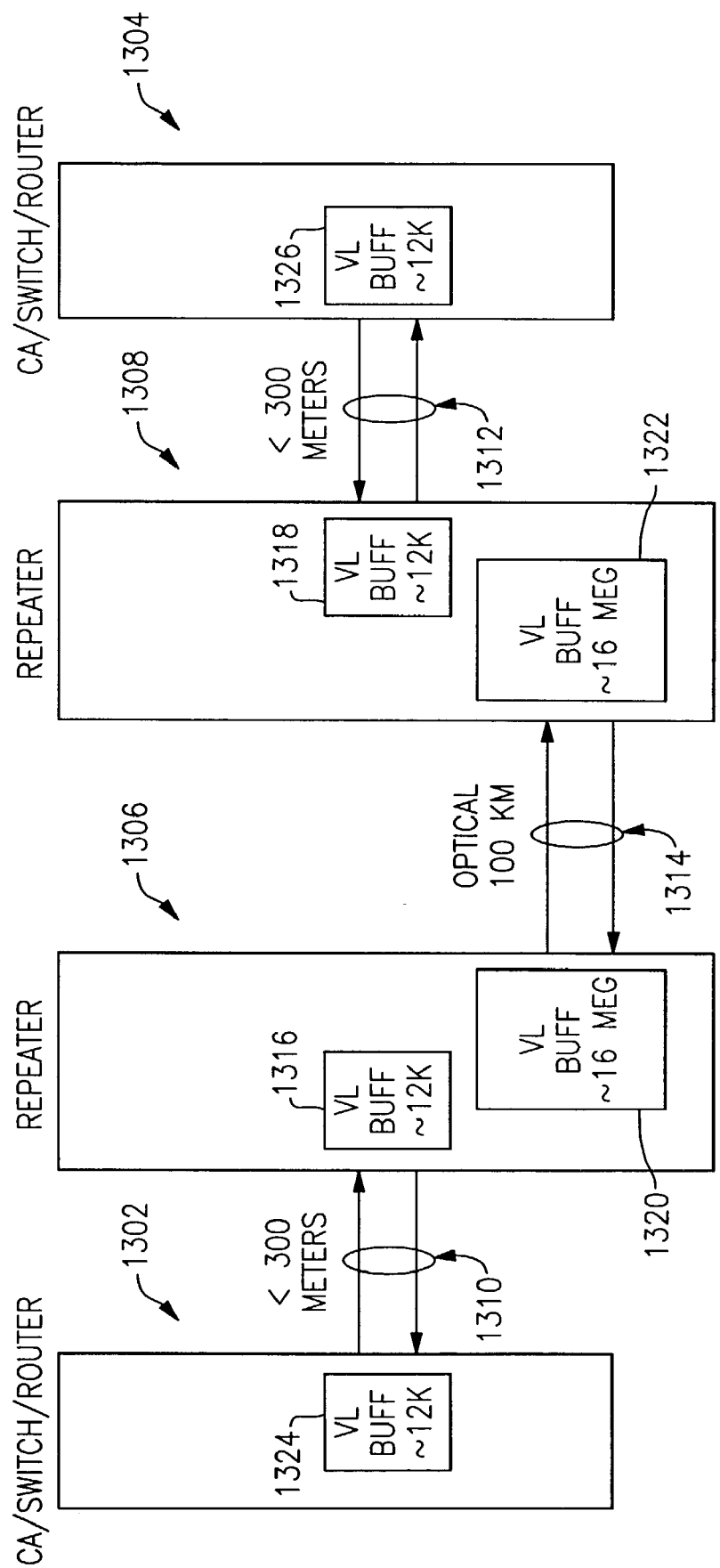
FIG. 13 is a diagram illustrating the link repeater with its virtual lane receiver buffers in accordance with a preferred embodiment of the present invention.

As mentioned above, the present invention provides an apparatus and method for extending the length of physical links without introducing routers and their interconnecting protocols. FIG. 13 shows the structure of a stand alone repeater. CA/Switch/Router 1302 is connected to CA/Switch/Router 1304 through repeaters 1306, 1308. Links 1310 and 1312 connect CA/Switch/Router 1302 to repeater 1306 and CA/Switch/Router 1104 to repeater 1308, respectively. CA/Switch/Router VL buffers 1324, 1326 are of a 'standard' size limiting links 1310, 1312 to a few hundreds of meters. The VL buffers 1316, 1318 in repeaters 1306, 1308 for the ports connected to the CA/Switch/Routers 1302, 1304 are also limited to the standard size because larger buffers have no benefit. However, the large VL buffers 1320, 1322 in repeaters 1306, 1308 can support relatively long distances. The optical link 1314 between repeaters 1306 and 1308 can be in the order of 100 kilometers with the VL receiver buffer sizes as shown in FIG. 12.

To support link lengths over 4.4 kilometers at 3 gigabytes per second, 13.1 kilometers at 1 gigabyte per second, and 52.4 kilometers at 250 megabytes per second, the flow control FCTBS 556 and FCCL 558 fields are extended beyond 12 bits. Twenty bit fields provide a flow control for up to 13,414 kilometers at 250 megabytes per second. This addition to the flow control is only required between the two repeaters, and it is not visible to the channel adapters 1302, 1304.

Figure 14:
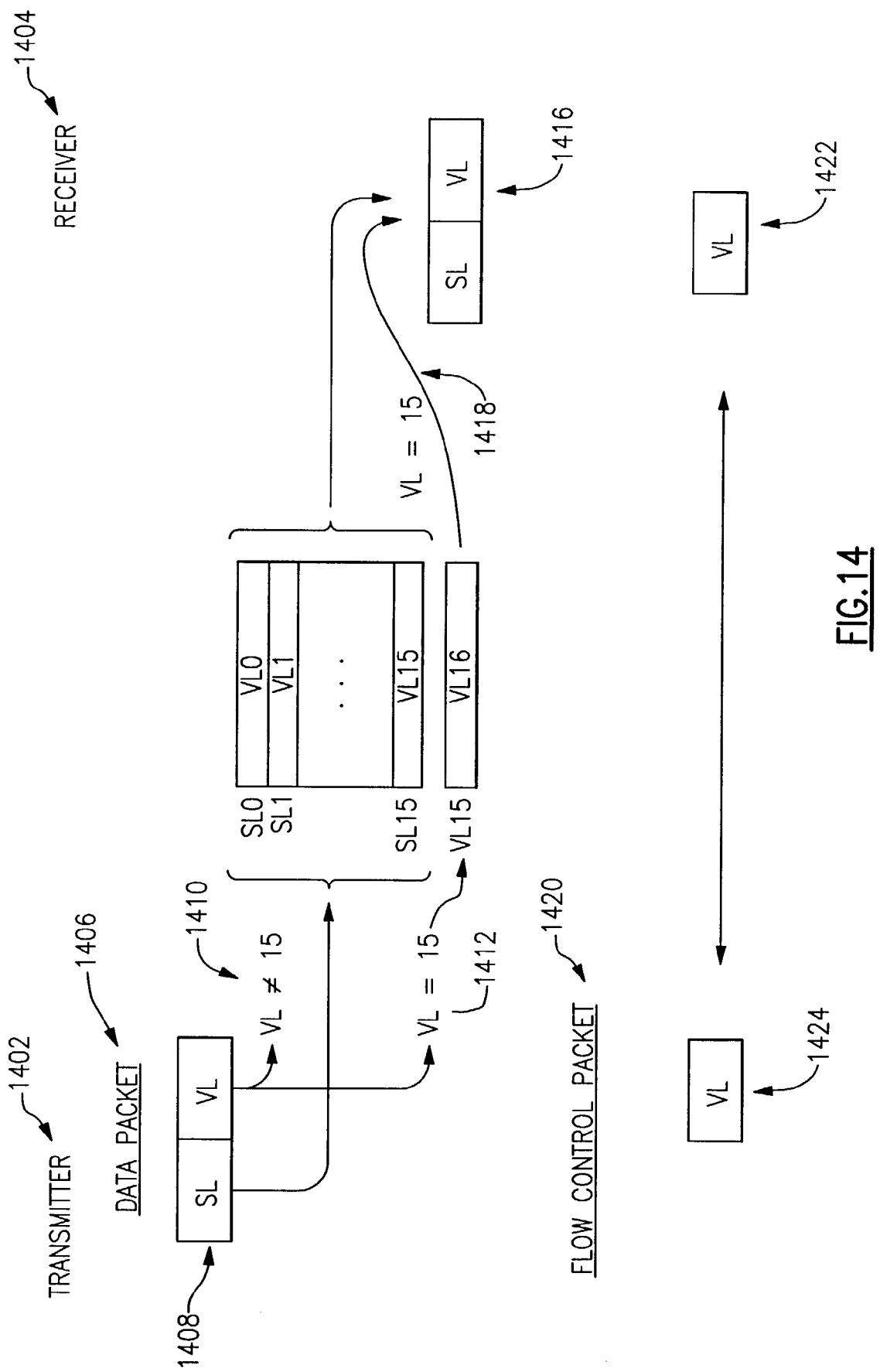
FIG. 14 is a diagram illustrating how the repeater assigns service levels and subnet management packets to its virtual lanes in accordance with the preferred embodiment of the present invention.

FIG. 14 illustrates how the repeaters implement their virtual lanes to carry the data packets in a way invisible to the Subnet Manager and the required extensions to the flow control packets. The transmitter 1402 sends data packets 1406 to the receiver 1404, and flow control packets 1420 are sent in both directions between the transmitter 1402 and receiver 1404. Each of the 16 Service Levels (SLs) needs its own data VL, but InfiniBand has only 15 data VLs. For full speed operation, the repeaters include virtual lanes 1414 for each of the 16 service levels and a 17th VL for the subnet management virtual lane (VL15). When the transmitter receives a data packet on its short distance port, it examines the Service Level (SL) and Virtual Lane (VL) fields 1408 in the header to determine which repeater VL to use to transmit the packet on its long distance port. Rather than using an SL to VL mapping table as used in normal InfiniBand links and set by the Subnet Manager, the transmitter 1402 first examines the VL. If the VL is not VL15, the SL selects which of the first 16 repeater VLs 1414 (0 through 15) to use. SL0 data packets are transmitted on VL0, SL1 data packets are transmitted on VL1, and so on up to SL15 data packets transmitted on VL15. If the VL is VL15, the transmitter 1402 sends the data packet using its extra 17th VL. This VL is numbered 16 as shown in FIG. 14. For all VLs and SLs, the SL and VL fields in the data packets are sent from the transmitter 1402 to the receiver 1404 unmodified. Therefore, even though a data packet with an SL of 4 and a VL of 6 is to be transmitted, the repeater uses its VL4 instead of VL6.

In the above example, when the receiver 1404 receives the packet on its long distance port with an SL of 4 and a VL of 6, it sends the data packet on its short distance link using VL6; the data packets are simply relayed along. As a result, the data packets flow through the repeaters without any modification, but each of the 16 SLs has its own VL with its own flow control.

In the normal InfiniBand flow control, VL15 is not subject to the flow control used by the 15 data VLs, and no flow control packets are ever sent for VL15. By having the repeaters use this 'spare' code point (15), 16 data virtual lanes can be supported by the flow control packets. When the receiver 1404 receives a packet on its long distance port, it examines the VL. If the VL is not VL15, the receiver uses the SL field rather than the VL field in the data packet to determine which of its 16 data VLs to use. When either the transmitter 1402 or receiver 1404 transmits a flow control packet on its long distance port, the VL field 1424, 1422 is the actual repeater VL number (0 through 15), and not the VL field in the data packet. When the receiver 1404 receives a packet on its long distance port for VL15, it uses its extra 17 VL numbered VL16 instead of its VL15. Since subnet management packets (VL15) are not subject to flow control, flow control packets are not transmitted, and the flow control packets do not require VL fields capable of 17 code points.

Because the invisible repeater has no knowledge of how many VLs are used on its shorter links, each data VL receiver buffer (0 through 15) has to handle the full data rate and distance. Subnet management (VL15) packets still require a VL large enough for a single management packet (256 byte payload) only, but more space, perhaps enough for a hundred management packets, is desirable and avoids potential bottle necks. With the above VLs, the repeater does not have to be configured by the InfiniBand Subnet Manager.

Some visibility of the repeaters is necessary to some level of software to monitor the repeaters activity such as the amount of data transferred and the errors detected.

The repeaters shown in FIG. 13 may be stand alone, two port structures with a single short distance and a single long distance port. Another packaging scheme for the repeaters is to include multiple long and/or short distance ports in a standard switch or router. With more than two ports, the switch or router must be configured by the Subnet Manager, just like any other switch or router, but the long distance repeater VL buffer scheme can still be used without Subnet Management involvement.

On the other hand to reduce the sizes of the VL receiver buffers in the repeater, the invisible flow control described above with the 17 VLs cannot be used. In this case, the Subnet Manager must configure the repeater, even if the repeater is a two port switch. For example, if there are only four VLs implemented in the long distance link, the Subnet Manager can assign the Service Levels (SLs) to the VLs in the same way that it does for normal links.

But even if the Subnet Manager controls the SL to VL mapping in the long distance repeater ports, very long links still require ports capable of handling flow control packets with expanded FCTBS 556 and FCCL 558 fields. Because the Subnet Manager has no knowledge of this added capability, the long distance ports need some low level manual enablement of this capability. In other words, long distance ports need to be attached to other long distance ports when activating the repeater function.

Figure 15:
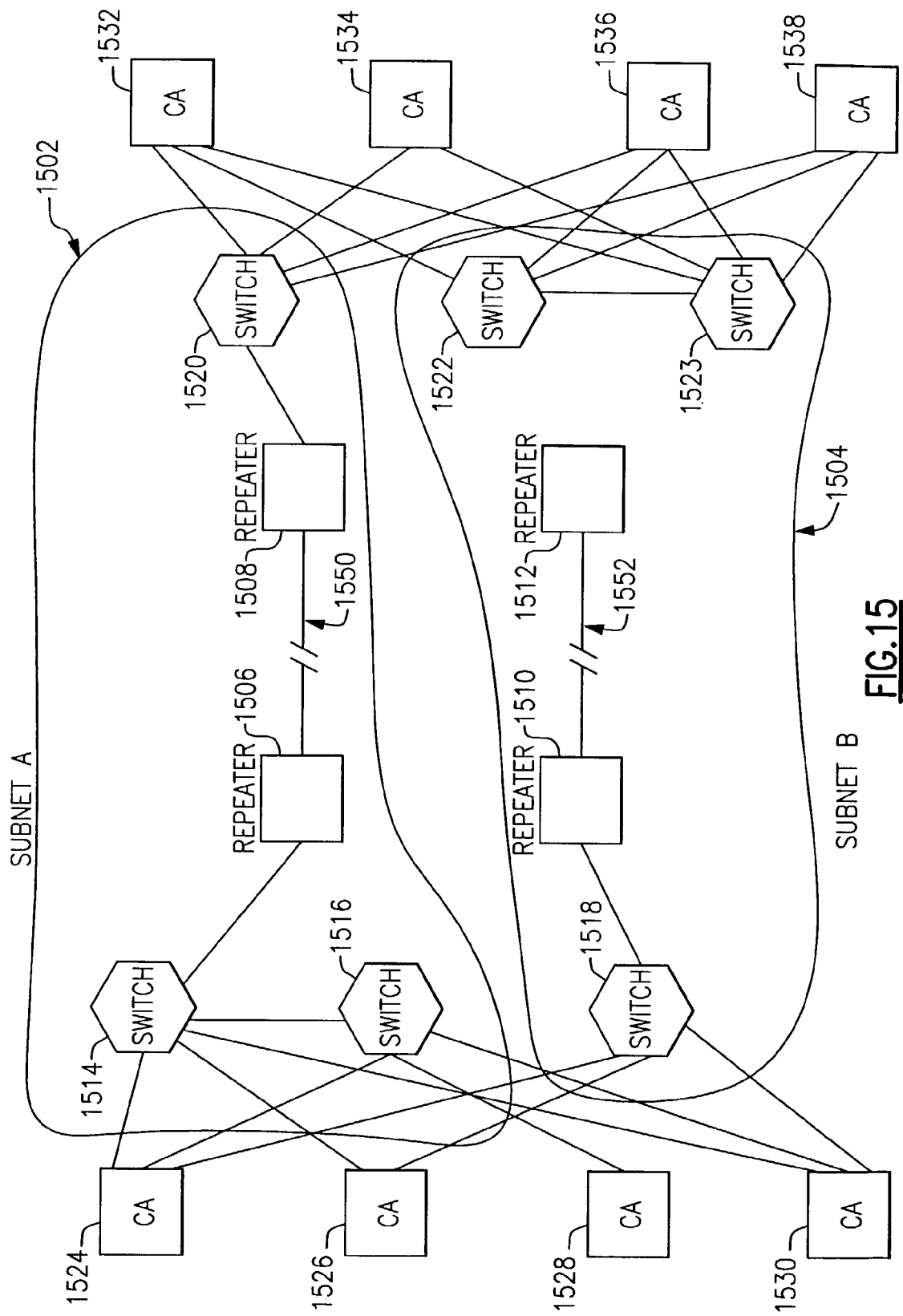
FIG. 15 is a diagram illustrating two clusters interconnected by a pair of long distance repeaters in accordance with the preferred embodiment of the present invention.

FIG. 15 illustrates how two clusters can be placed a relatively long distance from each other by interconnected them with two pairs of long distance repeaters. Two or more subnets and pairs of repeaters are used for capacity and redundancy. One cluster comprises CAs 1524, 1526, 1528, 1530, switches 1514, 1516, 1518, and repeaters 1506, 1510. A second cluster comprises CAs 1532, 1534, 1536, 1538, switches 1520, 1522, 1524, and repeaters 1508, 1512. Switches 1514, 1516, 1520, and repeaters 1506, 1508 are in subnet A 1502 and switches 1520, 1522, 1523 and repeaters 1510, 1512 are in subnet B 1504.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of extending the length of digital transmission links in a system area network, comprising:
   providing a pair of repeaters in said transmission link:
   incorporating virtual lane (VL) buffers into long distance ports of said repeaters;
   using said VL buffers to maintain absolute credit based flow control;
   using Service Levels (SLs) to select which VL buffers to use; and
   providing flow control for multiple large VL buffers wherein a repeater has at least one normal short distance port and one or more long distance port and the repeaters are made transparent to any Subnet Management function by; providing long distance links for use by data packets other than subnet management packets, a full compliment of 16 VL buffers, one for each Service Levels (Sls); transmitting on the long distance link SL0 data packets on VL0, SL1 data packets on VL1, and so on to SL15 data packets on VL15; receiving on the long distance link SL0 data packets into VL0, SL1 data packets into VL1, and so on to SL15 data packets into VL15; and providing flow control packets for all 16 long distance link VLs.

2. The method as recited in claim 1, wherein said repeater has at least one normal short distance port and one or more long distance port such that:
   the short distance ports connect to standard channel adapter, switch, or router ports; and
   the short distance ports have virtual lane buffers of standard size and function; while
   the long distance ports interconnect pairs of said repeaters; and
   the long distance ports have virtual lane buffers of large size with extended functions.

3. The method recited in claim 1, wherein at least one of the repeaters is made transparent to any Subnet Management function by providing a 17th VL for subnet management data packets.

4. The method recited in claim 1, wherein the SL end VL fields of the data packets received on the short distance ports are decoded by the transmitter to send VL0 through VL14 packets on the VL specified by the SL, and VL15 data packets on the 17th VL (VL16).

5. The method recited in claim 1, wherein the SL and VL fields of the data packets received on the long distance ports are decoded by the receiver to place SL0 through SL15 packets on the VL specified by the SL, and VL15 data packets on the 17th VL (VL16).

6. The method recited in claim 1, wherein the SL and VL fields in the data packets remains unchanged as:
  data packets enter the short distance port of a repeater and are retransmitted on the long distance port; and
  data packets are received on the long distance port of a repeater and are retransmitted on the short distance port.

7. The method recited in claim 1, wherein the block count fields in the flow control packets are extended to accommodate the data in flight on the long distance links.

8. A System Area Network apparatus for extending the operational distance of InfiniBand links, comprising:
  a plurality of InfiniBand links including at least on long distance link between extenders, at least one channel adapter, a switch and a plurality of router ports to handle long distance flow control over said long distance link, and
  a pair of repeaters in said long distance link, each repeater having a short distance port and a long distance port, whereby the ports used by the long distance link having said repeaters provide virtual lane buffers to handle long distance flow control at full link speed and wherein the repeaters are invisible to the InfiniBand management software.

9. The System Area Network according to claim 8 wherein the short distance port can operate at any valid InfiniBand speed or link width with virtual lane buffering for short distance ports to support links up to about 300 meters at the full ×12 speed while the long distance port operates at the narrowest width (×1) avoiding skew problems of multiple conductors.

10. The System Area Network according to claim 8 wherein the long distance port can operate at either the InfiniBand speed or it can operate at a faster speed (10 gigabits per second) to emulate the ×4 InfiniBand link width and virtual lane buffers are provided for the long distance ports to support distances of up to about 100 kilometers at speeds of 10 gigabits per second in each direction with extensions to the flow control packets of the long distance link used between the repeaters.

11. The System Area Network according to claim 8 wherein a dedicated virtual lane is assigned for each of the 16 service levels and an additional virtual lane for a subnet management virtual lane (VL15) and the flow control process handles 16 virtual lanes instead of only 15 virtual lanes when the repeaters are invisible to the InfiniBand management software.

12. The System Area Network according to claim 8 wherein there are a plurality of switches and said repeaters are in a cluster, and wherein a number of switch ports are configured with large virtual lane buffers to handle the long distance flow control, and wherein long distance ports are located at both ends of the long distance link for realizing the InfiniBand full data rate in both directions.

13. The System Area Network according to claim 8 wherein virtual lanes are made visible to the InfiniBand management software, and wherein a plurality of said virtual lanes are provided with long distance buffering reducing the head of line blocking and dead lock situations with very long distances using extensions to the flow control packets, but which extensions are invisible to other InfiniBand layers.

* * * * *